Feb. 17, 1959 C. G. VENDITTY ET AL 2,873,979
TILTING TRUCK CAB
Original Filed Dec. 29, 1953 2 Sheets-Sheet 1

C.G. VENDITTY
K.G. CRAWFORD
INVENTORS

BY

ATTORNEYS

Feb. 17, 1959

C. G. VENDITTY ET AL 2,873,979

TILTING TRUCK CAB

Original Filed Dec. 29, 1953

C.G. VENDITTY
K.G. CRAWFORD
INVENTORS

BY
ATTORNEYS

United States Patent Office 2,873,979
Patented Feb. 17, 1959

2,873,979

TILTING TRUCK CAB

Chester G. Venditty, Dearborn, and Kenneth G. Crawford, Livonia, Mich., assignors to Ford Motor Company, Dearborn, Mich., a corporation of Delaware Continuation of abandoned application Serial No. 400,954, December 29, 1953. This application May 17, 1957, Serial No. 663,565

13 Claims. (Cl. 280—87)

This invention relates generally to motor vehicles and more particularly to motor vehicles of the type to which the cab is adapted to be tilted to provide access to certain vehicle components.

This application is a continuation of the copending application of Chester G. Venditty and Kenneth G. Crawford, Serial No. 400,954, filed December 29, 1953, now abandoned.

In motor vehicles of this type it has been customary to mount the vehicle cab upon a pair of laterally spaced trunnions located near the forward portion of the cab to permit the latter to be tilted forwardly to provide access to the vehicle engine and other components for service and repair purposes. Since certain of the vehicle controls, such as the steering wheel, are normally mounted in the cab but are connected to chassis components, problems have arisen in connection therewith. In some designs the steering gear assembly has been mounted upon the vehicle frame and a detachable connection provided between it and the steering column carried by the cab. This arrangement results in alignment and interlock problems. In other constructions the steering gear assembly and the steering column have been both carried by the tilting cab. This arrangement, however, may result in movement of the steering linkage and the steerable road wheel or in movement of the reduction gearing and steering wheel during tilting movement of the cab.

The foregoing conditions are obviated in the present invention in which the steering gear assembly is rigidly mounted upon the vehicle frame and the steering column and steering wheel are carried by the cab as a unit therewith. Tilting movement of the cab and the steering column carried thereby is permitted by means of a universal joint connection between the steering post and the shaft of the steering gear assembly mounted upon the vehicle frame. The center of this universal joint is in alignment with the horizontally and transversely extending axis between the two forward trunnions forming the pivotal connection between the cab and the frame. As a result of this arrangement, the cab and the steering column and steering wheel carried thereby can be tilted forwardly without in any way interfering with the steering components. The tilting movement is effected without moving the steering linkage between the steering gear assembly and the steerable road wheel and also without rotating the steering wheel about its axis.

A further object of the invention is to provide a construction of this type requiring a minimum of special parts and which is economical to manufacture, service and assemble, yet which retains conventional steering characteristics.

Other objects and advantages of this invention will be made more apparent as this description proceeds, particularly when considered in connection with the accompanying drawings, wherein.

Figure 1:
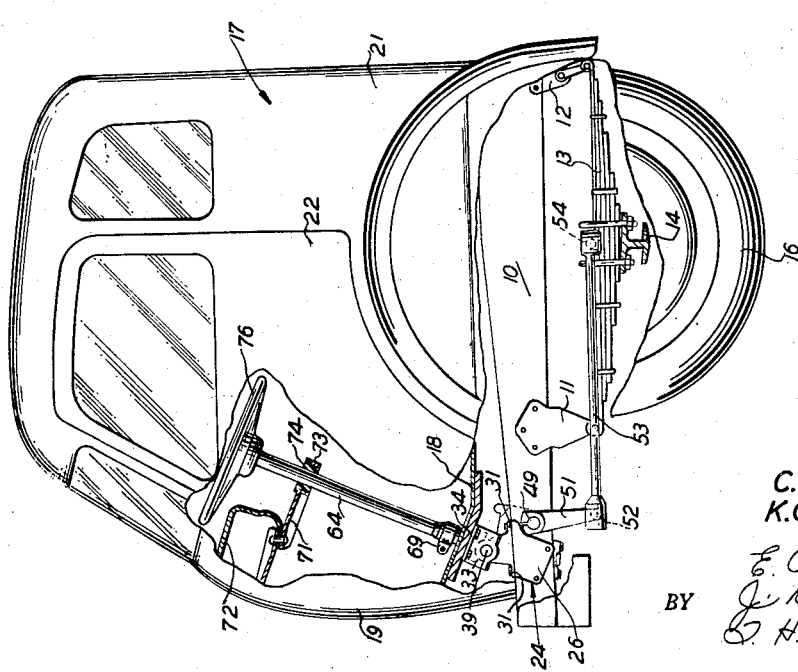
Figure 1 is a side elevational view of the forward portion of a motor vehicle incorporating the present invention, partly broken away and in section.

Referring now to Figure 1, the reference character 10 indicates the side frame rail of a motor vehicle of the commercial type. Front and rear spring hangers 11 and 12 form mountings for a leaf spring 13 supporting a front axle 14 and a steerable front road wheel 16.

Figure 2:
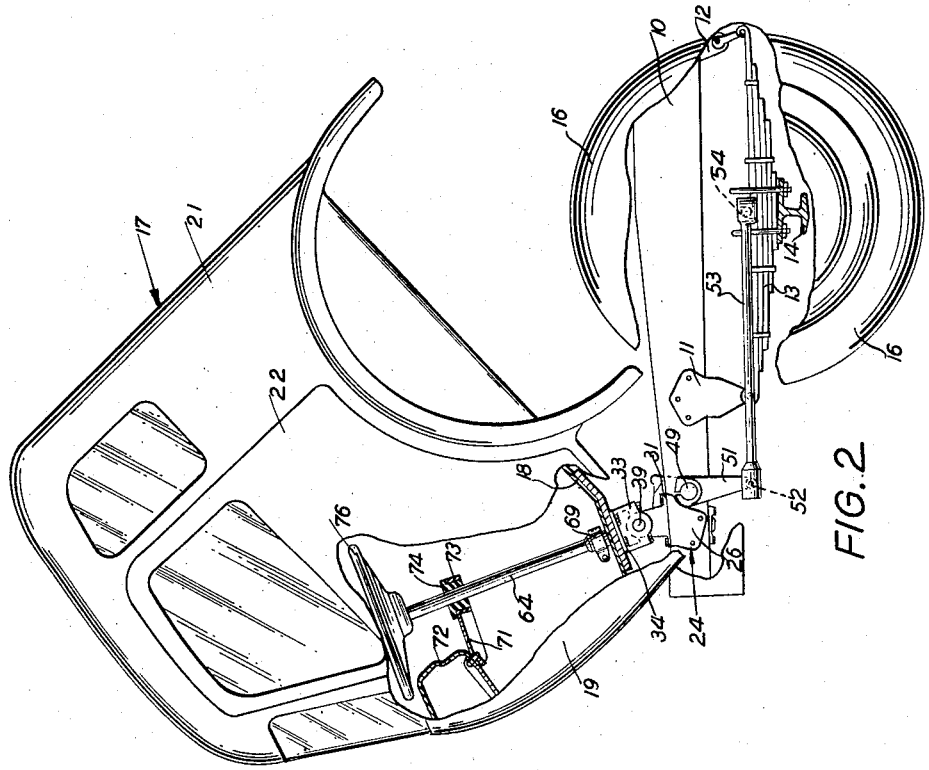
Figure 2 is a view similar to Figure 1 but with the cab in its forwardly tilted position.
Figure 3:
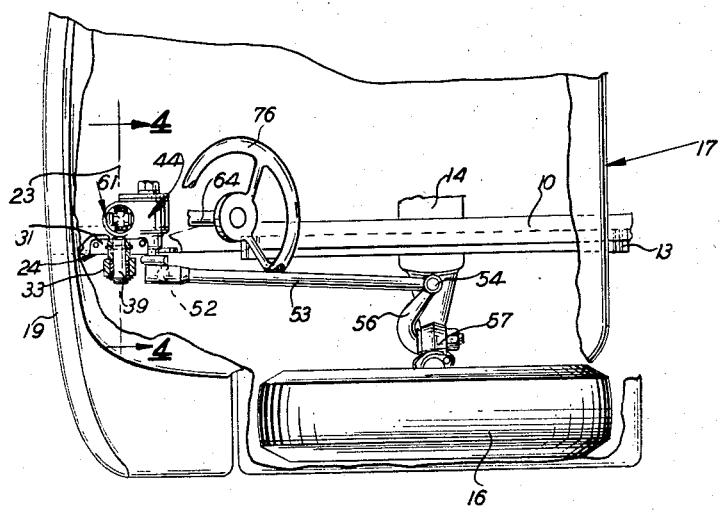
Figure 3 is a fragmentary plan view of the forward portion of the vehicle shown in Figure 1 partly broken away and in section.
Figure 4:
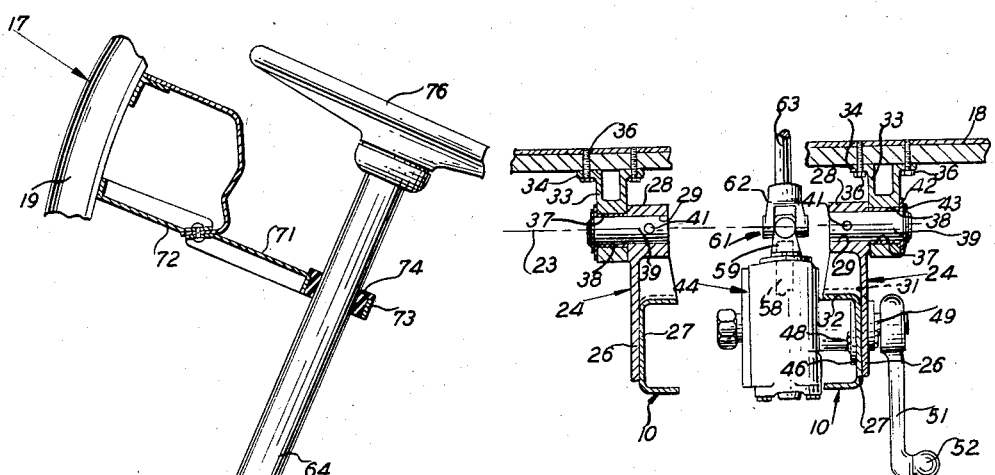
Figure 4 is an enlarged vertical cross sectional view taken substantially on the plane indicated by the line 4—4 of Figure 3.

Pivotally mounted upon the forward portion of the vehicle frame is a cab 17 having a reinforced floor panel 18, a front panel 19, side panels 21 and doors 22. As best seen in Figures 1, 3 and 4, the cab 17 is pivotally mounted upon the frame rails 10 for pivotal movement about a horizontal transversely extending axis 23. Pivotal movement of the cab about this axis from the position shown in Figure 1 to the position shown in Figure 2 provides access to the vehicle engine and other components (not shown) for service and repair purposes.

A frame bracket 24 is mounted upon each side frame rail 10 adjacent the forward end thereof. Each frame bracket 24 has a vertical side flange 26 bolted to the vertical side wall 27 of the U-shaped frame rail 10. The vertical flange 26 of each frame bracket 24 extends upwardly beyond the frame rail 10 and is provided at its upper end with a boss 28 having a horizontal transversely extending bore 29 formed therein. Each frame bracket 24 also has front and rear horizontal flanges 31 overlying the upper wall 32 of the channel shaped frame rail 10 and bolted thereto.

The frame brackets 24 at opposite sides of the vehicle are identical except for being reversed and the bores 29 formed in the upper bosses 28 thereof are transversely and horizontally aligned with each other. Each side of the cab 17 is provided with a supporting bracket 33 formed with outwardly projecting side flanges 34. The flanges 34 are secured to the underside of the reinforced cab floor panel 18 by means of bolts 36. Each supporting bracket 33 is located adjacent a frame bracket 24 on the outboard side thereof, and is provided with a bore 37 in alignment with the bore 29 of the frame bracket. A bushing 38 is mounted in the bore 37 of each supporting bracket 33, and a short trunnion 39 extends through the bushing 38 and the aligned bore 29 in the frame bracket 24. The trunnion 39 is secured to the frame bracket 24 by means of a pin 41. The assembly is completed by means of a washer 42 and a retaining ring 43 seated in an annular groove in the end of the trunnion 39.

From the foregoing it will be seen that the cab 17 is mounted upon the vehicle frame for pivotal movement about a horizontal transversely extending axis 23 by means of the aligned trunnions 39 forming pivotal connections between the frame brackets 24 mounted on the frame side rails 10 and the supporting brackets 33 carried by the cab floor panel.

A generally conventional steering gear assembly 44 containing reduction gearing is mounted upon the frame rail 10 at the left side of the vehicle. The steering gear assembly 44 is formed with an integral longitudinally extending flange 46 (Figure 5) provided with attachment bosses 47. Bolts 48 extend through the attachment bosses 47 on the flange 46 of the steering gear assembly 44 and secure the latter to the vertical side wall 27 of the channel shaped frame member 10. The pitman arm shaft 49 of the steering gear assembly extends horizontally through the flange 46 and the frame member 10 and carries at its outboard end a conventional pitman arm 51 having a ball connection 52 with the forward end of a drag link 53 extending generally horizontally adjacent the outboard side of the frame rail 10. At its rearward end the drag link 53 is connected by a ball joint 54 (Figure 3) to a steering arm 56 secured to steering knuckle 57 of the front road wheel 16.

Figure 5:
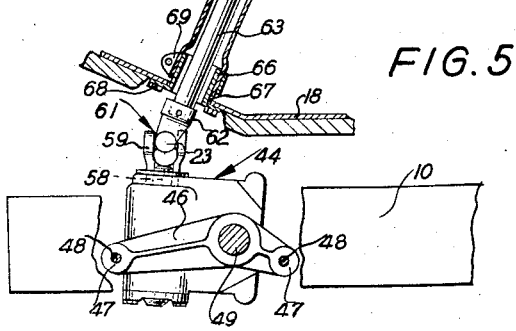
Figure 5 is an enlarged side elevational view of a portion of the construction shown in Figure 1, partly broken away and in section.

Referring now to Figures 4 and 5 the steering gear assembly 44 carried by the vehicle frame is also provided with a steering gear shaft 58 projecting through the upper wall thereof. In the conventional vehicle construction this steering gear shaft is extended upwardly and forms the steering post to the upper end of which the steering wheel is connected. In the present construction, however, the steering gear shaft 58 terminates just above the upper portion of the steering gear assembly 44 and has mounted thereon the lower yoke 59 of a universal joint assembly 61 of the cardan type. The upper yoke 62 of the universal joint 61 is secured to the lower end of a steering wheel shaft or post 63.

The steering post 63 normally extends at an angle to the steering gear shaft 58, and is journaled within a tubular steering column 64 carried by the cab. At its lower end the column 64 embraces and slidably engages the hub of a flanged sleeve 66 projecting upwardly through an opening 67 in the cab floor 18 and secured thereto by bolts 68. A clamping ring 69 encircles the lower end of the steering column 64 to clamp the latter to the flanged sleeve 66 and to form a support for the lower end of the steering column.

The upper end of the steering column is also supported upon the cab, by means of a bracket 71 secured to the lower portion of the cab instrument panel 72. The outer end of the bracket 71 is formed with a sleeve portion 73, containing a rubber bushing 74 forming a resilient mounting for this portion of the steering column and permitting slight movement thereof to accommodate possible manufacturing variations and misalignments. A conventional steering wheel 76 is secured to the upper end of the steering post 63 adjacent the upper end of the steering column 64.

Upon reference to Figures 3 and 4, it will be seen that the universal joint 61 connecting the steering post 63 with the steering gear shaft 58 is aligned with the trunnions 39 forming the pivotal mounting for the cab. Consequently, the truck cab 17 and the steering column assembly are both mounted for pivotal movement about a common horizontal transversely extending axis 23. Tilting movement of the cab and the steering column assembly carried thereby can accordingly be accomplished without resulting in any steering movements of either the steering wheel, steering post, steering gear assembly, or the steering linkage interconnecting the steering gear with the steerable road wheel. An advantageous construction results since the steering mechanism is entirely uneffected by tilting movement of the cab and requires no attention or adjustment during tilting movement of the cab.

The universal joint 61 and the cab trunnions 39 are designed to be in exact alignment in a horizontal transverse direction. Manufacturing variations may result, however, in slight misalignments under certain conditions, and such misalignments would tend to stress the various parts involved. This possibility however is minimized by mounting the steering column in such manner as to permit limited movement thereof, both angularly with respect to the trunnion axis 23 as well as longitudinally of the column. The rubber bushing 74 between the mounting bracket 71 and the steering column 64 permits a limited movement therebetween if necessary, while the sleeved connection between the lower end of the steering column 64 and the flanged sleeve 66 carried by the cab floor 18 permits a limited sliding movement therebetween if required during tilting of the cab by reason of misalignment of the universal joint and the trunnions.

It will be understood that the invention is not to be limited to the exact construction shown and described, but that various changes and modifications may be made without departing from the spirit and scope of the invention, as defined in the appended claims.

What is claimed is:

1. In a motor vehicle, a frame having a pair of longitudinally extending laterally spaced side frame rails, said side frame rails being channel shaped and opened inwardly toward each other, steerable front road wheels at opposite sides of the forward portions of said side frame rails, a steering gear assembly including a reduction unit having a housing provided with a flange secured to the inner side of the vertical outer wall of one of said side frame rails, a steering gear input shaft projecting generally vertically from said steering gear assembly, a pitman arm output shaft extending laterally from said steering gear assembly in an outboard direction, a pitman arm secured to said pitman arm shaft, steering linkage interconnecting said pitman arm with said steerable road wheels to steer the latter upon turning movement of said steering gear shaft, a pair of brackets each having a vertical flange secured to the outer side of the vertical wall of one of said side frame rails with one of said brackets being located adjacent the steering gear housing and spaced laterally outwardly therefrom, a cab for said vehicle, a pair of brackets secured to the lower forward portion of said cab on opposite sides thereof with each of said brackets being located on the outboard side of said first mentioned brackets, a pair of trunnions pivotally connecting said first mentioned brackets to said second mentioned brackets, said trunnions being in axial alignment with each other in a horizontal transverse direction to mount said cab for pivotal movement about a horizontal transversely extending axis spaced above the forward portions of said side frame rails, said trunnions being relatively short so that the inboard end of the trunnion adjacent said steering gear assembly terminates above the adjacent side frame rail, a steering column mounted upon said cab for movement therewith during tilting of the cab about said trunnions, a steering post extending concentrically within said steering column, a steering wheel at the upper end of said steering post, said steering post projecting downwardly beneath said cab and terminating adjacent the upper end of the steering gear shaft, and a universal joint interconnecting the upper end of said steering gear shaft with the lower end of said steering post, said universal joint having its center located on the pivotal axis of said cab formed by said horizontally and transversely aligned trunnions and spaced a short distance from one of said trunnions in an inboard direction.

2. In a motor vehicle, a frame having a pair of longitudinally extending laterally spaced side frame rails, steerable front road wheels at opposite sides of the forward portions of said frame rails, a steering gear assembly mounted upon one of said frame rails at the inboard side thereof, a steering gear shaft projecting generally vertically from said steering gear assembly, a pitman arm shaft projecting from said steering gear assembly, linkage interconnecting said pitman arm shaft and said steerable road wheels, a first pair of brackets each secured to one of said side frame rails and projecting upwardly therefrom, a cab for said vehicle, a second pair of brackets secured to the lower forward portion of said cab and located adjacent said first brackets, trunnions pivotally connecting said first and second brackets, said trunnions being in axial alignment with each other in a horizontal transverse direction, a steering column mounted upon said cab for movement therewith during tilting of the cab about said trunnions, a steering post within said steering column projecting downwardly beneath said cab and terminating adjacent the upper end of said steering gear shaft, and a universal joint interconnecting the upper end of said steering gear shaft with the lower end of said steering post, said universal joint having its center located on the pivotal axis of said cab formed by said aligned trunnions and spaced a short distance from one of said trunnions in an inboard direction.

3. In a motor vehicle, a frame having a pair of longitudinally extending laterally spaced side frame rails, steerable front road wheels at opposite sides of the forward portions of said frame rails, a steering gear assembly rigidly mounted upon one of said side frame rails, a steering gear shaft projecting generally vertically from said steering gear assembly, a pitman arm shaft projecting from said steering gear assembly, linkage interconnecting said pitman arm shaft and said steerable front road wheels, a pair of brackets each mounted upon one of said side frame rails, a totally enclosed cab for said vehicle having a floor enclosing the lower portion thereof and a pair of doors on opposite sides thereof, a pair of brackets secured to said cab adjacent the forward portion of the floor thereof with each of said brackets being located adjacent one of the first mentioned brackets secured to said side frame rails, a pair of axially aligned trunnions pivotally connecting said first and second brackets together to mount said cab for pivotal movement about a horizontal transverse axis, a steering column mounted upon said cab for movement therewith during tilting of the cab about said trunnions, a steering post extending within said steering column and projecting downwardly through the floor of said cab and terminating adjacent the upper end of the steering gear shaft, and a universal joint interconnecting the upper end of said steering gear shaft with the lower end of said steering post, said universal joint having its center located on the pivotal axis of said cab formed by said trunnions, said pivotal axis being located beneath the floor of said cab and above said side frame rails.

4. In a motor vehicle, a frame, steerable front road wheels for said frame, a steering gear assembly rigidly mounted upon said frame and having a generally vertically extending steering gear shaft and a pitman arm shaft, steering linkage interconnecting said pitman arm shaft and said steerable road wheels, an enclosed passenger compartment for said vehicle having roof and floor panels and side walls forming an enclosure, a pair of doors in opposite side walls of said compartment to provide passenger access, a steering column mounted within said compartment, a steering post in said steering column and extending through the forward portion of the floor panel of said compartment, a universal joint connecting the lower end of said steering post with the upper end of said steering gear shaft, and means pivotally mounting said enclosed passenger compartment upon said vehicle frame for pivotal movement about a horizontal transverse axis extending through said universal joint, said axis being located beneath the floor panel of said compartment and above said vehicle frame.

5. In a motor vehicle, a frame having a pair of longitudinally extending laterally spaced side frame rails, steerable front road wheels at opposite sides of the forward portions of said frame rails, a steering gear assembly mounted upon one of said frame rails and having a steering gear shaft, means interconnecting said steering gear assembly and said steerable road wheels, a first pair of brackets each secured to one of said side frame rails, a cab for said vehicle, a second pair of brackets secured to the lower forward portion of said cab and located adjacent said first brackets, means pivotally connecting said first and second brackets for pivotal movement of said cab about a horizontal transverse axis, a steering shaft mounted upon said cab for movement therewith during tilting of the cab, the lower end of said steering shaft terminating adjacent said steering gear shaft, and a universal joint interconnecting said steering gear shaft and said steering shaft, said universal joint having its center located substantially on the pivotal axis of said cab.

6. In a motor vehicle, a frame having a pair of longitudinally extending laterally spaced side frame rails, steerable front road wheels at opposite sides of the forward portions of said frame rails, a steering gear assembly mounted upon one of said side frame rails and having a steering gear shaft, means interconnecting said steering gear assembly and said steerable front road wheels, a pair of brackets each mounted upon one of said side frame rails, an enclosed cab for said vehicle having a floor at the lower portion thereof, a pair of brackets secured to said cab adjacent the forward portion of the floor thereof with each of said brackets being located adjacent one of the first mentioned brackets secured to said side frame rails, means pivotally connecting said first and second brackets to mount said cab for pivotal movement about a horizontal transverse axis, a steering shaft mounted upon said cab for movement therewith during tilting of the cab, and a universal joint interconnecting said steering gear shaft with said steering shaft, said universal joint having its center located substantially on the pivotal axis of said cab.

7. In a motor vehicle, a frame, steerable road wheels for said frame, a steering gear assembly mounted upon said frame and having a steering gear shaft, means interconnecting said steering gear assembly and said steerable road wheels, an enclosed passenger compartment for said vehicle having roof and floor panels and side walls forming an enclosure, a steering shaft mounted within said compartment and extending through the floor panel of said compartment, a universal joint connecting the lower end of said steering shaft with said steering gear shaft, and means pivotally mounting said enclosed passenger compartment upon said vehicle frame for pivotal movement about a horizontal transverse axis extending substantially through said universal joint.

8. In a motor vehicle, a frame, steerable road wheels for said vehicle, a steering gear assembly mounted upon said frame and having a steering gear shaft, means interconnecting said steering gear assembly and said steerable road wheels, an enclosed passenger compartment for said vehicle having a floor at the lower portion thereof, a steering shaft mounted within said compartment and extending through said floor, a universal joint located beneath said floor connecting the lower end of said steering shaft with said steering gear shaft, and means pivotally mounting said enclosed passenger compartment upon said vehicle frame for pivotal movement about an axis extending substantially through said universal joint.

9. In a motor vehicle, a frame, steerable road wheels for said vehicle, a steering gear assembly mounted upon said frame and having a steering gear shaft and a driven shaft angularly related to each other, means operatively connecting said driven shaft to said steerable road wheels, an enclosed passenger compartment for said vehicle having a floor at the lower portion thereof, a steering shaft mounted within said compartment and extending through said floor, a universal joint located beneath said floor and above said driven shaft and connecting the lower end of said steering shaft with said steering gear shaft, and means pivotally mounting said enclosed passenger compartment upon said vehicle frame for pivotal movement about an axis extending substantially through said universal joint.

10. In a motor vehicle, a frame, steerable road wheels for said vehicle, an enclosed cab for said vehicle having roof and floor panels and side walls forming an enclosure, a door in one side wall providing passenger entry to the interior of said cab, means pivotally mounting said enclosed cab upon said frame for tilting movement about a transverse horizontal axis, a steering shaft mounted within said enclosed cab for tilting movement therewith, a steering wheel within said cab for rotating said steering shaft, the lower end of said steering shaft projecting through said floor panel, steering mechanism mounted upon said frame beneath said cab floor and having an input shaft, means universally connecting said steering and input shafts substantially on the pivotal axis of said cab, and means connecting said steering mechanism and said steerable road wheels.

11. In a motor vehicle, a frame, steerable road wheels for said vehicle, an enclosed passenger compartment for said vehicle, means pivotally mounting said enclosed passenger compartment upon said frame for tilting movement relative to said frame, a rotatable steering shaft mounted within said passenger compartment for tilting movement therewith, steering mechanism carried by said frame and operatively connected to said road wheels to steer the latter, and a universal joint operatively connecting said steering shaft to said steering mechanism, said universal joint being located substantially on the axis of tilting of said enclosed passenger compartment.

12. In a motor vehicle, a frame, steerable road wheels for said vehicle, a steering gear assembly mounted upon said frame and having a steering gear shaft and a driven shaft angularly related to each other, means operatively connecting said driven shaft to said steerable road wheels, an enclosed passenger compartment for said vehicle, a steering shaft rotatably mounted within said compartment, a universal joint connecting the lower end of said steering shaft with said steering gear shaft, said universal joint being located above said driven shaft, and means pivotally mounting said enclosed passenger compartment upon said vehicle frame for tilting movement about an axis extending substantially through said universal joint.

13. In a motor vehicle, a frame having a pair of longitudinally extending laterally spaced side frame rails, steerable front road wheels at opposite sides of the forward portions of said frame rails, a steering gear housing mounted upon one of said frame rails, an input shaft journaled in said housing and an end portion projecting from the upper portion of said housing, an output shaft journaled in said housing and operatively driven by said input shaft, said output shaft extending generally at right angles to said input shaft and located beneath the projecting end portion of said input shaft, means interconnecting said output shaft and said steerable front road wheels to steer the latter, an enclosed passenger compartment for said vehicle pivotally mounted upon said vehicle frame for tilting movement about a transverse horizontal axis, a steering shaft rotatably mounted in said enclosed passenger compartment for movement therewith during tilting of said compartment, and a universal joint connecting the lower end of said steering shaft and the projecting end portion of said input shaft, said universal joint being substantially on the axis of tilting of said enclosed passenger compartment.

References Cited in the file of this patent

UNITED STATES PATENTS

| | | |
|---|---|---|
| 748,252 | Anderson | Dec. 29, 1903 |
| 2,226,656 | Best | Dec. 31, 1940 |
| 2,376,491 | Kinney | May 22, 1945 |
| 2,502,622 | Harris | Apr. 4, 1950 |
| 2,721,616 | Rocha | Oct. 25, 1955 |

FOREIGN PATENTS

| | | |
|---|---|---|
| 816,637 | Germany | Oct. 11, 1951 |